United States Patent
Kapur

(10) Patent No.: US 8,010,529 B2
(45) Date of Patent: Aug. 30, 2011

(54) SYSTEM AND METHOD FOR DETERMINING A RELATIONSHIP BETWEEN AVAILABLE CONTENT AND CURRENT INTERESTS TO IDENTIFY A NEED FOR CONTENT

(75) Inventor: Shyam Kapur, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 585 days.

(21) Appl. No.: 11/585,288

(22) Filed: Oct. 23, 2006

(65) Prior Publication Data

US 2008/0097955 A1    Apr. 24, 2008

(51) Int. Cl.
*G06F 17/30* (2006.01)
(52) U.S. Cl. ........... 707/730; 707/750
(58) Field of Classification Search .......... 707/1–10, 707/100–104.1, 696, 711, 727, 730, 750
See application file for complete search history.

(56) References Cited

U.S. PATENT DOCUMENTS

| | | | |
|---|---|---|---|
| 6,721,748 B1 * | 4/2004 | Knight et al. | 707/10 |
| 7,194,483 B1 * | 3/2007 | Mohan et al. | 707/104.1 |
| 2003/0115191 A1 * | 6/2003 | Copperman et al. | 707/3 |
| 2007/0078822 A1 * | 4/2007 | Cucerzan et al. | 707/3 |

* cited by examiner

*Primary Examiner* — Shahid A Alam
*Assistant Examiner* — Dawaune Conyers
(74) *Attorney, Agent, or Firm* — Seth H. Ostrow; Ostrow Kaufman LLP

(57) ABSTRACT

A system and method for comparing search queries provided by a user with content items available in an index. Search queries are received and stored in a database query log. Content items are located on a network and stored in an index. A value is generated for concepts and categories in the query log and the index. The value for different categories and concepts in the query log is compared with the value for different categories and concepts in the index. A need for content is determined for a given concept and category, which may be communicated to content providers, e.g., web site operators.

18 Claims, 3 Drawing Sheets

SYSTEM AND METHOD FOR DETERMINING A RELATIONSHIP BETWEEN AVAILABLE CONTENT AND CURRENT INTERESTS TO IDENTIFY A NEED FOR CONTENT

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS REFERENCE TO RELATED REFERENCES

The present application is related to the following commonly owned U.S. Patents and Patent applications:

U.S. patent application Ser. No. 11/295,166, entitled "SYSTEMS AND METHODS FOR MANAGING AND USING MULTIPLE CONCEPT NETWORKS FOR ASSISTED SEARCH PROCESSING," filed on Dec. 5, 2005;

U.S. patent application Ser. No. 10/797,586, entitled "VECTOR ANALYSIS OF HISTOGRAMS FOR UNITS OF A CONCEPT NETWORK IN SEARCH QUERY PROCESSING," filed on Mar. 9, 2004;

U.S. patent application Ser. No. 10/797,614, entitled "SYSTEMS AND METHODS FOR SEARCH PROCESSING USING SUPERUNITS," filed on Mar. 9, 2004; and U.S. Pat. No. 7,051,023, entitled "SYSTEMS AND METHODS FOR GENERATING CONCEPT UNITS FROM SEARCH QUERIES," filed on Nov. 12, 2003;

The disclosures of which are hereby incorporated by reference herein in their entirety.

FIELD OF THE INVENTION

The invention relates to identifying a need for content items on the Internet and informing content makers of specific content needs. More particularly, the invention is directed to a system for comparing a database containing a log of search queries with documents from a database corresponding to the search queries to determine the content needs of one or more users.

BACKGROUND OF THE INVENTION

The World Wide Web ("WWW") is a distributed database including content items that are accessible through one or more interconnected networks, e.g., the Internet. Searching and indexing these pages to produce useful results in response to user queries is an ongoing challenge for providers of search services. A search engine is typically used to search content items available via the WWW. A search engine collects content items (or references to content items, also referred to as links) from the Internet or other sources through the use of a crawler, which aggregates content items for indexing and searching. Although many algorithms exist for use in collecting content items, many crawlers follow links in known hypertext documents or other content items to obtain additional, subsequent content items. The crawler stores content items that it retrieves in a database and an indexing component builds a searchable index of the content items in database. Typical indexing methods include inverted files, vector spaces, suffix structures, and hybrids thereof, as well as other similar indexing techniques known to those of skill in the art. For example, a given web page may be broken down into words and respective locations of each word on the page. The pages are then indexed by the words and their respective locations. A primary index of the contents of the database is then decomposed into a plurality of sub-indices, with each sub-index sent to a search node in a search node cluster.

A search engine may receive one or more query terms that the search engines uses to search the index, generating sorted search results along with an identifier and a relevance score for a given result. The relevance score is a function of the query itself and the content item. Factors that are used for relevance include: a static relevance score for the document such as link cardinality and page quality, superior parts of the document such as titles, metadata and document headers, authority of the document such as external references and the "level" of the references, as well as document statistics such as query term frequency in the document, global term frequency, and term distances within the document.

Terms comprising a given search query and, more specifically, topics, themes, concepts, or categories to which the terms relate, may indicate trends in consumer interests and needs of users executing searches. Such trends and their future directions, as indicated by search terms, are of interest to content providers as they may have an impact on business economics, affecting advertising strategies and costs, as well as the success and quantity of sales and other business activities. Trends in the informational needs of users conducting searches may be difficult to predict, leaving businesses with little direction when predicting advertising costs, sales, etc. New techniques are needed to reduce the hardship caused by such unpredictability, or, where it is believed that a good trend prediction is available, to capitalize on the prediction. Businesses have an interest in predicting the needs of information consumers, as indicated by search terms, whether for economic or advertising reasons. Content providers also have an interest in attempting to predict such trends as what the next "hot" entertainer will be, what singer's current popularity will soon be on the downslide, what the next consumer electronics rage will be, etc., as well as providing additional content items regarding the same such that sufficient and appropriate content is available to information consumers.

Currently, systems and methods do not exist by which content providers may determine with accuracy the content needs for specific concepts and categories that a given user (or group of users) needs or desires. Similarly, there are presently no systems and methods that enable users to communicate specific content needs to information providers. Thus, there is a need in the art for systems and methods operative to determine a relationship between available content and current interests to identify an need for content.

SUMMARY OF THE INVENTION

The present invention relates to a system and method for comparing search queries provided by a user with documents corresponding to the search queries. Search queries are received and stored in a database query log. Documents are retrieved based on the search queries and stored in a database index. A value is generated for each different item in the database query log and the database index. The value for each different item in the database query log is compared to the value for each different item in the database index. A need for content is then determined for each different item and communicated to content makers of web sites, as well as other entities, organizations and end users.

The method may comprise sorting the first data store based on concepts and categories. Similarly, the second data store may be sorted based on concepts and categories. According to one embodiment, the first value is a concept frequency and the second value is a concept frequency. Similarly, the fist value may be a category frequency and the second value may be a category frequency. According to another embodiment, the first data store is a query log and the second data store is an index. A content need may be transmitted to users or producers of content. The method may additionally be stored on computer readable media as one or more pieces of program code for determining a content need.

The present invention is also directed towards a system for determining a need of a user for at least one content item. The system according to one embodiment comprises a first data store for the storage of one or more search requests, the first data store further operative to maintain concept and category information for the one or more search requests, and a second data store for storing an index of content items, the first data sore further operative to maintain concept and category information for one or more entries in the index. A processor is coupled to the first data store and the second data store, the processor operative to compare concept and category information for the search requests with concept and category information for the entries in the index to identify a need for content.

The search request in said first data store may be sorted in accordance with concept and category information. Similarly, the entries in the index may be sorted in accordance with concept and category information. The processor may calculate a frequency for a given concept in the first data store and a frequency for a given category in the first data store. Similarly, the processor may calculate a frequency for a given concept in the second data store and a frequency for a given category in the second data store.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Figure 1:
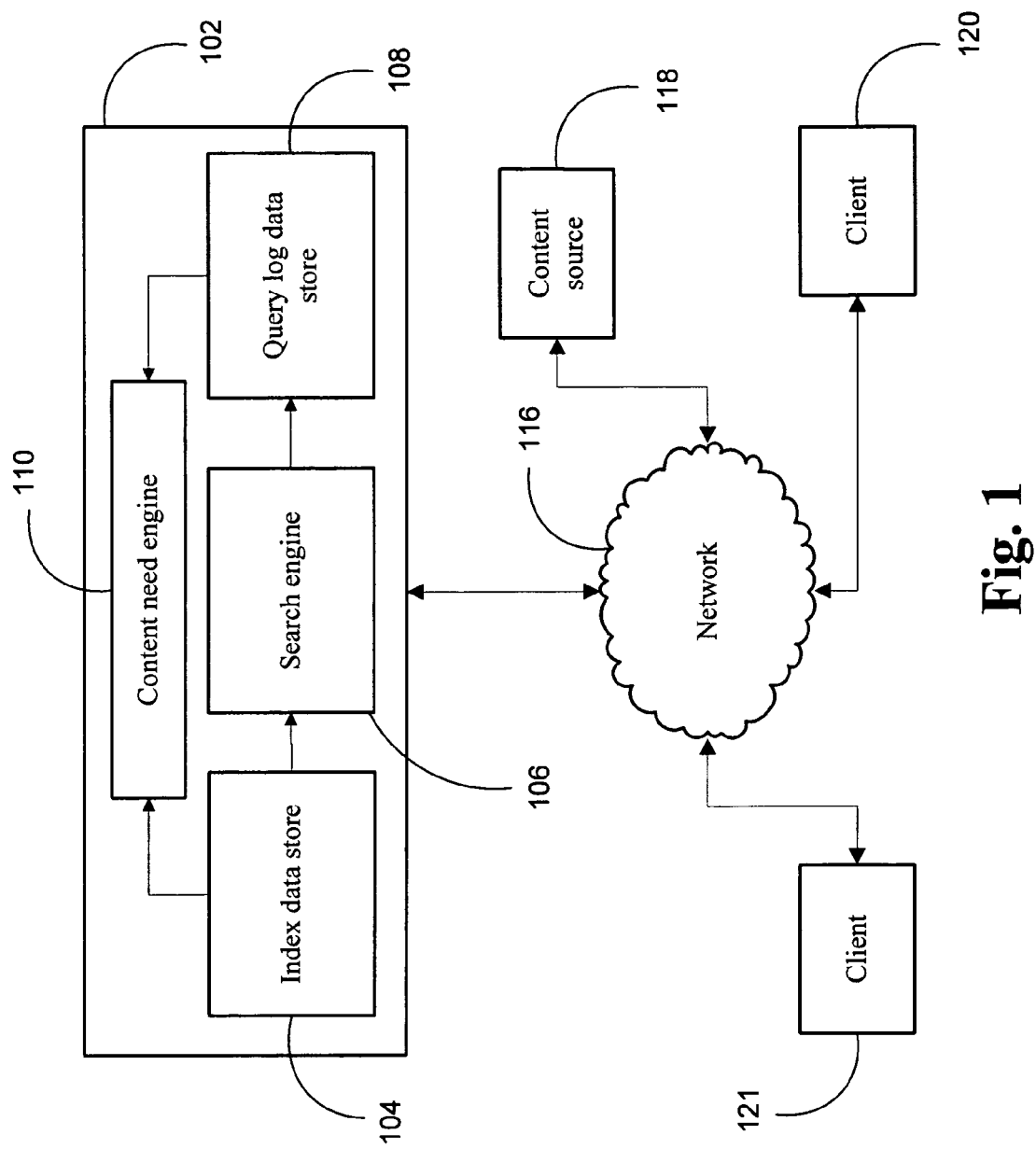
FIG. 1 is a block diagram illustrating a system for comparing a query log with a database index to determine a content need in accordance with an embodiment of the present invention.

Referring to FIG. 1, one embodiment of a system for determining a content need for one or more users is illustrated. The exemplary system of FIG. 1 comprises a search provider 102, one or more content sources 116 and one or more clients 118 and 120, which are coupled to an in communication over a network 116 operative to transmit data. The network 116 may comprise various combinations of local and wide area networks, operating over various combinations of wired and wireless infrastructures, such as the global Internet.

One or more clients 120 and 122 are communicatively coupled to the network 116 to transmit data over the network 116 and process information that a given client 120 and 122 receives over the network 116. According to one embodiment, a given client device is a 120 and 121 is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

A given client device 120 and 121 transmits search requests to the search provider 102 over the network 116. At the search provider 102, a search engine 106 receives the search request for processing and retrieval of a result set that is responsive to the search request. The search engine 106 retrieves a result set in response to a search request by executing a search of an index at the index data store 104. According to one embodiment, the index is an index of word-location pairs for one or more words appearing in one or more content items. The search engine 106 parses the search request to identify one or more search terms, locates instances of the search terms in the index, and returns a result set comprising links to the content items in which the search terms appear. Construction of the index, as well conducting searches thereof, is described in commonly owned U.S. Pat. No. 6,021,409, entitled "METHOD FOR PARSING, INDEXING AND SEARCHING WORLD-WIDE-WEB PAGES," and U.S. Pat. No. 5,745,889, entitled "METHOD FOR PARSING INFORMATION OF DATABASE RECORDS USING WORD-LOCATION PAIRS AND META WORD-LOCATION PAIRS," the disclosures of which are hereby incorporated by reference herein in their entirety.

When adding content items to the index, or alternatively after content items have been added to an index, the search provider 102 may determine concept and category information for a given content item. Using systems and methods for the determination of a concept or category for a given entry in the index, program code at the index data store may be operative to assign concept information to the given entry, and may also or alternatively assign category information to the given entry in the index. By maintaining concept and category information, the index data store is operative to expose information regarding the amount of content available within a given category or concept.

A client device 121 and 122 in communication with the network 116 issues one or more search queries to a search engine 106 at the search provider 102. According to one embodiment, the search provider maintains a web server (not pictured) that the search engine 106 uses to transmit an HTML interface to a browser (not pictured) at a given client 121 and 122 and receive one or more search requests. The search engine 106 provides a result set comprising links to one or more locations on the network 116 in response to the search request, e.g., an HTML page comprising an ordered list of links to content items. Using techniques known to those of skill in the art, the search engine 116 may also add program code to a given link to record an indication of a selection of the given link.

The search engine 106 writes a copy of the search request from the client device 120 and 121 to a query log data store 108. The query log data store may comprise a flat file data structure (e.g., tab or comma separated value file), relational database, object oriented database, a hybrid object-relational database, etc. According to embodiments of the invention, the search engine 106 writes ancillary information to the query log data store 108 in addition to the search request, which may include date and time, user identification information, one or more selected URLs from a result set that the search engine 106 generates in response to the search request, etc. Search requests in the query log data store 108 may be sorted based on concept and category classification for a given search request, whereby logic or program code at the search engine 106 (or other component of the search provider 102) identifies concept and category information for a given query according to the techniques described in the applications incorporated herein by reference.

In addition to the foregoing components, the search provider 102 may comprise a content need engine 110, which according to embodiments of the invention is operative to identify whether or not a content need that is being expressed as search requests from one or more clients 120 and 121 is being satisfied by the corpus of documents available in the index data store 104 at any given point in time. The content need engine 110 may determine whether or not a content need is being satisfied by examining the number of content items that the index data store 104 identifies as being associated with a given concept or category versus the number queries in a query log data store 108 that users are issuing that are associated with the given concept or category. For example, the content need engine 110 may determine a content need based on the frequency with which a given concept appears in the index data store 104 falling below a threshold, which is a function of the number of search requests in the query log data sore 108 that are associated with the given concept. Alternatively, the content need engine 110 may identify a content need where the frequency with which a given concept appears in search requests is greater than a frequency with which the given concept appears in the index data store 104. Content need may also, or alternatively, be performed in terms of the frequency of concepts in the index data store 104 and query log data store 108

The content need engine 110 is operative to generate one or more reports for transmission over the network 116 to operators of a given content source 118. As discussed above, the content need engine 110 is operative to identify a content need in a given concept or category. The reports that the content need engine 110 generates may identify a set of categories and concepts for which the content needs of users are not being met. For example, if there is a sudden spike in the number of users issues search requests for information regarding a new popular music artist and only a small number of content sources 118 have relevant content items that the index data store 104 is indexing, the content need engine 110 may produce a report indicating that the search engine 106 needs additional content items regarding the music artist. In addition, the surveys may be sent to one or more groups of individual users to solicit feedback regarding content need, which may be incorporated into the report.

Figure 2:
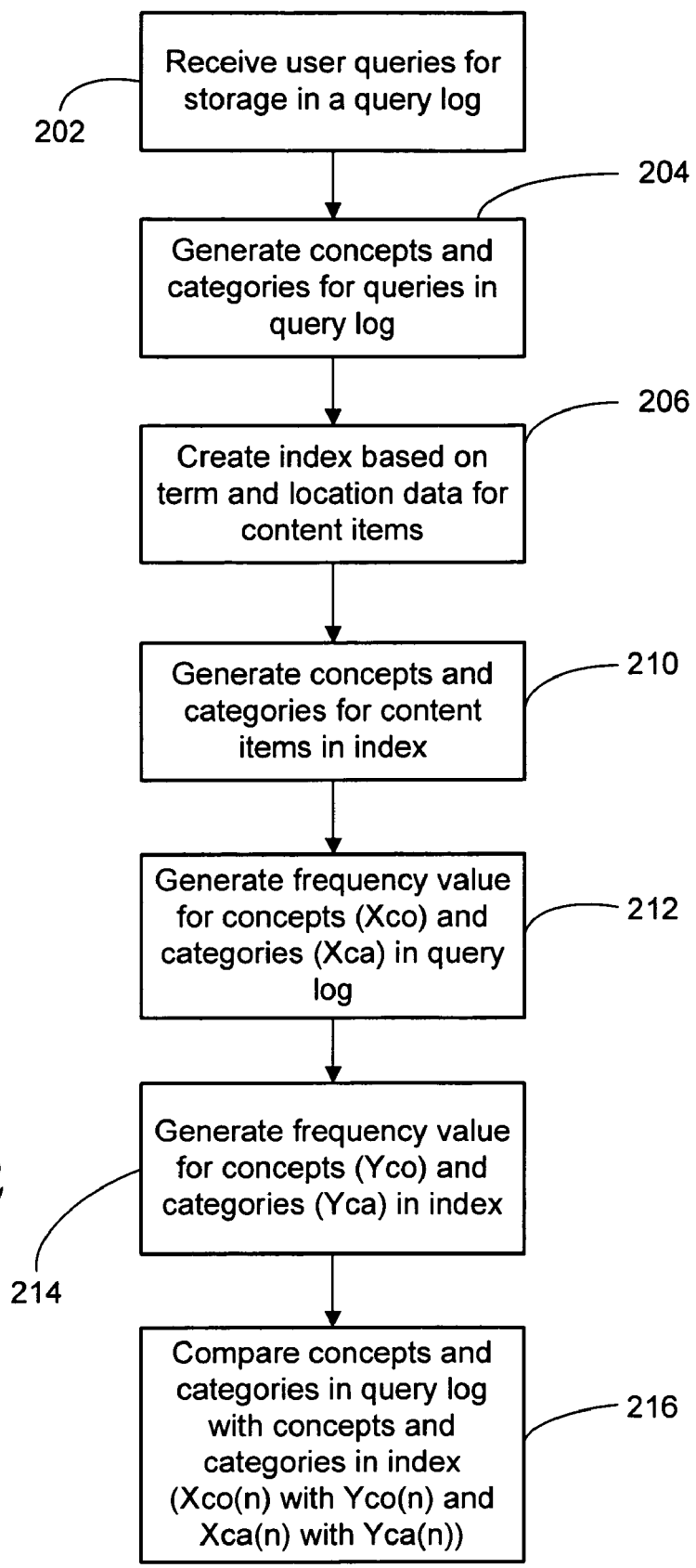
FIG. 2 is a flow diagram illustrating a process for comparing a query log with a content index to determine a content need in accordance with an embodiment of the present invention.

A process for comparing a query log with an index data store to determine a content need is now described with regard to FIG. 2, which describes the process in accordance with one embodiment of the present invention. According to the present embodiment, the process begins with the receipt of a search request or query from a user at client device, which the search engine may store in query log, step 202. Concept information for the search requests or queries in the query log is calculated, step 204, which may be calculated by the search engine or other program code at the search provider. Similarly, category information may also be calculated for the search requests in the query log.

An index is also created by the search provider for storage in an index data store. The index may be an index of word-location pairs, whereby a given word-location pair identifies one or more content items that comprise the given word, step 206. The index may be supplemented with category information, and may also or alternatively be supplemented with concept information, step 210. The index may further be sorted in accordance with the category or concept information. The concept and category information may be added to the index by an indexing component that is operative to generate the index, which may comprise an index of word-location pairs.

Continuing with FIG. 2, a frequency value may be calculated for a given concept contained in query log, step 212. Similarly, a frequency value may be calculated for a given category in the query log. For example, the first concept "New York Hotels" might be found 2500 times in query log and the second concept "Manhattan Restaurants" might be found 4000 times. Accordingly, the following variables may be assigned values illustrated in Table 1:

TABLE 1

| $X_{co}(1) = 2500$ |
|---|
| $X_{co}(2) = 4000$ |

Similarly, a frequency value may be calculated for a given category contained in query log, step 212. For example, the first category "Britney Spears" might be found 10000 times in database query log 410 and the second category "rap music" might be found 8000 times. Accordingly, the following variables may be assigned values illustrated in Table 2:

TABLE 2

| $X_{ca}(1) = 10000$ |
|---|
| $X_{ca}(2) = 8000$ |

In addition to frequency information with regard to concepts and categories in the query log, a frequency value may be calculated for a given concept contained in the index, step 214. For example, the first concept "New York Hotels" might be found in 2000 documents in the index and the second concept "Manhattan Restaurants" might be found in 6000 documents. Accordingly, the following variables may be assigned values illustrated in Table 3:

TABLE 3

| $Y_{co}(1) = 2000$ |
|---|
| $Y_{co}(2) = 6000$ |

Similarly, a frequency value may be calculated for a given category contained in the index, step 214. For example, the first category "Britney Spears" might be found in 10000 documents in the index and the second category "rap music" might be found in 8000 documents. Accordingly, the following variables may be assigned values illustrated in Table 4:

TABLE 4

Yca(1) = 10000
Yca(2) = 8000

The frequency of a given concept in the query log may be compared with the frequency of a corresponding given concept in the index to determine if a content need for the given concept is being met, step 216. Likewise, the value of a given category in the query log may be compared with the value of a corresponding given different category in the index. With reference to the above-mentioned example, Xco(1) may be compared to Yco(1), Xco(2) to Yco(2), Xca(1) to Yca(1), and Xca(2) to Yca(2).

Figure 3:
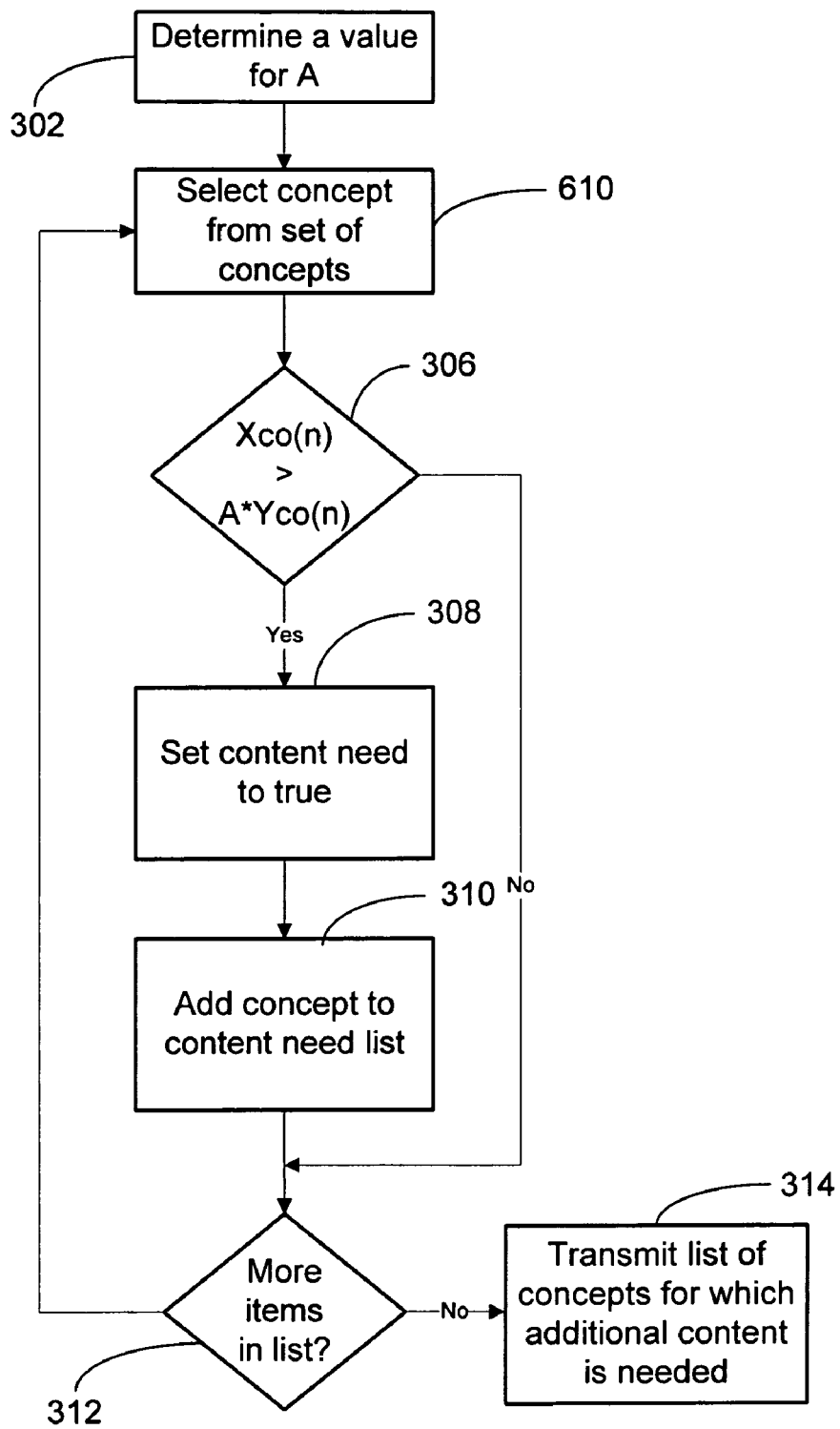
FIG. 3 is a flow diagram illustrating a process for comparing concepts from a query log with concepts from a content index to determine a content need in accordance with an embodiment of the present invention.

FIG. 3 presents a flow diagram illustrating a process for comparing concepts from a query log with concepts from an index in accordance with one embodiment of the present invention. The process may begin with the determination of a value, "A," which is a multiplier that represents a number of times greater that the frequency of a given concept in the query log may be than the given concept in the index to find a content need, step 302. A given concept is selected from a set of one or more concepts, step 304. According to one embodiment, the set of one or more concepts comprises the set of available concepts present in a query log. Alternatively, or in conjunction with the foregoing, the set of one or more concepts comprises the set of available concepts present in an index at a search engine.

A check is performed, which may be performed by a software or hardware component at the search provider, e.g., the content need engine, to determine if the frequency of the selected concept contained in query log is greater than some value (A) multiplied by the frequency of the selected concepts contained in the index, step 306, e.g., Xco(n)>A*Yco(n). For example, if A is set to 5 for the first concept "New York Hotels" (using the above-identified example from FIG. 2), Xco(1)<5*Yco(1)=(2500<5*2000). Accordingly, no content need is identified for the concept since there is a sufficient amount of documents in the index to satisfy the search requests in query log. For the second concept from FIG. 2, "Manhattan Restaurants," Xco(2)>5*Yco(2)= (40000>5*6000). As such, a content need is identified for the concept since there is an insufficient amount of content in the index to satisfy the search requests in the query log. It should be noted that the multiplier "A" may be adjusted such that different multipliers may be utilized with disparate concepts or categories. Additionally, the multiplier may be computer or estimated using a variety of techniques known to those of skill in the art.

If the check performed at step 306 evaluates to true, meaning that users are searching for a concept that is not sufficiently represented by the documents in the index, a content need flag for the concept is set to true, step 308. This concept may be added to the list or set of concepts for which additional content is needed, step 310, which may be sent to operators of a given content source who may supply additional content for the concept. According to one embodiment, an indication of content need is only sent to those content sources that have previously provided content that is associated with the needed concept.

Regardless of whether the check at step 306 evaluates to true, program flow is directed to step 312 where a check is performed to determine if additional concepts are available for selection. Where addition concepts are available for selection and analysis, a subsequent concept is selected, step 304, and processing repeats. If there are no additional concepts for selection, step 312, processing completes with the list or set of concepts for which additional content is needed sent to content producers, operators of content sources, etc. It should be noted by those of skill in the art that the process of FIG. 3 may be repeated for categories that the query log and index maintain.

FIGS. 1 through 3 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A computerized method for determining a need of a user for at least one content item, the method comprising:
   receiving one or more search queries for one or more content items, and storing the one or more search queries in a first data store;
   determining concept and category information associated with each of the one or more search queries;
   electronically, indexing, via a processing device, the one or more content items in a second data store, each of the one or more content items in the second data store associated with the concept and category information;
   electronically, generating, via the processing device, an amount of the one or more queries associated with a common concept and category information stored in the first data store;
   electronically, generating, via the processing device, an amount of the indexed one or more content items associated with the common concept and category information;
   determining a need for additional content items associated with the common concept and category information for the indexed one or more content items on the basis of the amount of the one or more queries being greater than the amount of the indexed one or more content items multiplied by a multiplier associated with the common concept and category information; and
   notifying the need for additional content items associated with the common at least one of a concept and a category to content producers.

2. The method of claim 1, comprising sorting the first data store based on concepts and categories.

3. The method of claim 1, comprising sorting the second data store based on concepts and categories.

4. The method of claim 1, wherein the first data store is a query log.

5. The method of claim 1, wherein the second data store is an index.

6. A system for determining a need of a user for at least one content item, the system comprising:
   a first data store for the storage of one or more search requests for one or more content items, the first data store further operative to maintain concept and category information for the one or more search requests;
   a second data store for storing an index of the one or more content items, the second data store further operative to maintain concept and category information for one or more entries in the index; and
   a processor coupled to the first data store and the second data store, the processor operative to compare a difference in amounts between search requests and entries in the index associated with one or more common concept and category information, determine a need for additional content items associated with the common concept and category information for the index of the one or more content items on the basis of a greater amount of search requests than an amount of entries in the index multiplied by a multiplier associated with the common concept and category information, and notify the need for additional content items associated with the at least one of a concept and a category to content producers.

7. The system of claim 6, wherein the search request in said first data store are sorted in accordance with concept and category information.

8. The system of claim 6, wherein the entries in the index are sorted in accordance with concept and category information.

9. The system of claim 6, wherein the processor calculates a frequency for a given concept in the first data store.

10. The system of claim 6, wherein the processor calculates a frequency for a given category in the first data store.

11. The system of claim 6, wherein the processor calculates a frequency for a given concept in the second data store.

12. The system of claim 6, wherein the processor calculates a frequency for a given category in the second data store.

13. Non-transitory computer readable media containing program code that when executed by a processor causes the processor to perform a method for determining a need of a user for at least one content item, the computer readable media comprising:
   program code for receiving one or more search queries for one or more content items, and storing the one or more search queries in a first data store;
   program code for determining concept and category information associated with each of the one or more search queries;
   program code for indexing the one or more content items in a second data store, each of the one or more content items in the second data store associated with concept and category information;
   program code for generating an amount of the one or more queries associated with a common concept and category information stored in the first data store;
   program code for generating an amount of the indexed one or more content items associated with the common concept and category information;
   program code for determining a need for additional content items associated with the common concept and category information for the indexed one or more content items on the basis of the amount of the one or more queries being greater than the amount of the indexed one or more content items multiplied by a multiplier associated with the common concept and category information; and
   program code for notifying the need for additional content items associated with the at least one of a concept and a category to content producers.

14. The computer readable media of claim 13, comprising program code for sorting the first data store based on concepts and categories.

15. The computer readable media of claim 13, comprising program code for sorting the second data store based on concepts and categories.

16. The computer readable media of claim 13, wherein the first data store is a query log.

17. The computer readable media of claim 13, wherein said second data store is an index.

18. The computer readable media of claim 13, comprising program code for communicating the content need to content producers.

* * * * *